US012508933B2

(12) United States Patent
Jeon (10) Patent No.: US 12,508,933 B2
(45) Date of Patent: Dec. 30, 2025

(54) SYSTEM FOR RESPOND TO A DEMAND RESPONSE, CONTROL CIRCUIT FOR ELECTRIC VEHICLES TO RESPOND TO A DEMAND RESPONSE AND METHOD FOR DRIVING THE SAME (71) Applicant: HL KLEMOVE CORP., Incheon (KR)

(72) Inventor: Joonyoung Jeon, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 871 days.

(21) Appl. No.: 17/714,056

(22) Filed: Apr. 5, 2022

(65) Prior Publication Data

US 2022/0332208 A1 Oct. 20, 2022

(30) Foreign Application Priority Data

Apr. 14, 2021 (KR) .................. 10-2021-0048838

(51) Int. Cl.
*B60L 53/64* (2019.01)
*B60L 53/18* (2019.01)
*B60L 53/30* (2019.01)
*B60L 53/62* (2019.01)
*B60L 53/63* (2019.01)

(52) U.S. Cl.
CPC .............. *B60L 53/64* (2019.02); *B60L 53/18* (2019.02); *B60L 53/62* (2019.02); *B60L 53/63* (2019.02); *B60L 53/305* (2019.02)

(58) Field of Classification Search
CPC .......... B60L 53/64; B60L 53/62; B60L 53/63; B60L 53/10; B60L 53/305; B60L 53/60; B60L 53/66; B60L 55/00; B60L 58/00

USPC ........................................................ 320/109
See application file for complete search history.

(56) References Cited

U.S. PATENT DOCUMENTS

| 2014/0062401 | A1* | 3/2014 | Gadh ...................... B60L 53/67 320/109 |
| 2014/0200724 | A1* | 7/2014 | Sortomme .............. H02J 3/008 700/291 |
| 2014/0327408 | A1* | 11/2014 | Ishii ........................ B60L 53/14 320/135 |
| 2016/0144728 | A1* | 5/2016 | Harper .................... B60L 53/67 320/109 |

FOREIGN PATENT DOCUMENTS

KR 10-2101509 4/2020

* cited by examiner

*Primary Examiner* — Julian D Huffman
*Assistant Examiner* — Nathan J Instone
(74) *Attorney, Agent, or Firm* — WOMBLE BOND DICKINSON (US) LLP (57) ABSTRACT The present disclosure relates to a system for respond to a demand response, a control circuit for electric vehicles, and a method for driving the same capable of efficiently responding to a demand response. The system includes an on board diagnostic configured to receive a demand response signal directly from a distributed energy resource management system and output a command signal according to the demand response signal from the distributed energy resource management system, a charging device configured to charge a battery of an electric vehicle, and a charge reference change circuit configured to modulate a pilot signal supplied from a charging equipment to the charging device according to a command signal from the on board diagnostic.

9 Claims, 5 Drawing Sheets

| STATE | PILOT HIGH VOLTAGE | PILOT LOW VOLTAGE | FREQUENCY | RESISTANCE | DESCRIPTION |
|---|---|---|---|---|---|
| State A | 12V | N/A | DC | N/A | Not connected |
| State B | 9V | -12V | 1 kHz | 2.74 kΩ | EV connected ready to charge |
| State C | 6V | -12V | 1 kHz | 882 Ω | EV charging |
| State D | 3V | -12V | 1 kHz | 246 Ω | EV charging ventilation required |
| State E | 0V | 0V | N/A | — | Error |
| State F | N/A | -12V | N/A | — | Unknown error |

FIG. 5

SYSTEM FOR RESPOND TO A DEMAND RESPONSE, CONTROL CIRCUIT FOR ELECTRIC VEHICLES TO RESPOND TO A DEMAND RESPONSE AND METHOD FOR DRIVING THE SAME

CROSS-REFERENCE TO RELATED APPLICATION

This application claims priority under 35 U.S.C. § 119 to Korean Patent Application No. 10-2021-0048838, filed on Apr. 14, 2021, in the Korean Intellectual Property Office (KIPO), the disclosure of which is incorporated by reference herein in its entirety.

TECHNICAL FIELD

The present disclosure relates to a system for respond to a demand response, and more particularly, to a system for respond to a demand response, a control circuit for electric vehicles, and a method for driving the same capable of efficiently responding to a demand response.

BACKGROUND

Renewable facilities and power generation, including solar power, are rapidly increasing, and distributed energy resources such as ESS and electric vehicles are also on the rise. Here, with the advancement and convergence of technology, an electricity market is becoming a dynamic market where many operators and consumers buy and sell electricity from the existing simple structure of supply and consumption.

The conventional demand response related technologies and standards are very complex. This is because each market took precedence over the concept of demand response, and different interests among governments, utilities, charging station operators, and EV manufacturers make it very complex to integrate systems using different protocols.

For example, according to the existing demand response related technology, there is a problem in that since the protocol is different for each communication hub, it is difficult to integrate the system, since communication delay occurs every time it passes through each communication hub, it is difficult for the system to respond quickly, since standardization has not been completed until now, standards are constantly changing, and it may not be applied to an electric vehicle (EV) sold in the past.

RELATED ART DOCUMENT

Patent Document (Patent Document 1) Korean Patent No. 10-2101509 (Registered on Apr. 9, 2020)

SUMMARY

In view of the above, the present disclosure provides a system for respond to a demand response, a control circuit for electric vehicles, and a method for driving the same capable of efficiently responding to a demand response.

According to embodiments of the present disclosure, a control circuit for electric vehicles to respond to a demand response, includes: an on board diagnostic configured to receive a demand response signal directly from a distributed energy resource management system and output a command signal according to the demand response signal from the distributed energy resource management system; a charging device configured to charge a battery of an electric vehicle; and a charge reference change circuit configured to modulate a pilot signal supplied from a charging equipment to the charging device according to a command signal from the on board diagnostic.

The charge reference change circuit may modulate a pilot signal supplied from the charging equipment to the charging device by modulating a duty ratio of the pilot signal.

The charge reference change circuit may include: an impedance matching unit configured to match impedances between the charging equipment and the charge reference change circuit according to the command signal from the on board diagnostic; and a duty ratio modulation unit configured to transmit the pilot signal of a modulated duty ratio to the charging device according to a command signal from the on board diagnostic.

The impedance matching unit may include: a first switching element configured to be controlled according to a command signal from the on board diagnostic and connected between a first node and a second node; and a first resistor configured to be connected between the second node and the third node.

The duty ratio modulation unit may include: a second resistor; a second switching element configured to be controlled according to a command signal from the on board diagnostic and connected between the first node and one terminal of the second node; and a pulse generator configured to be connected between the other terminal of the second resistor and the third node.

The charge reference change circuit may be disposed in either an electric vehicle or a charging cable connecting the electric vehicle and the charging equipment.

According to embodiments of the present disclosure, a system for respond to a demand response includes: a distributed energy resource management system; an electric vehicle configured to directly receiving a demand response signal from the distributed energy resource management system; and a charging equipment, in which a control circuit of the electric vehicle may include: an on board diagnostic configured to receive the demand response signal directly from the distributed energy resource management system and output a command signal according to the demand response signal; a charging device configured to charge a battery of the electric vehicle; and a charge reference change circuit configured to modulate a pilot signal supplied from a charging equipment to the charging device according to a command signal from the on board diagnostic.

According to embodiments of the present disclosure, a method for driving a control circuit for electric vehicles to respond to a demand response includes: receiving a demand response signal directly from a distributed energy resource management system, and outputting a command signal according to the demand response signal; and modulating a pilot signal supplied from a charging equipment to a charging device for automatically charging a battery according to the command signal.

The modulating of the pilot signal may include modulating a duty ratio of the pilot signal.

First, since it is only necessary to comply with open ADR protocol between a distributed energy resource management system and electric vehicles, the system may be simplified and implemented relatively simply.

Second, since communication nodes between a distributed energy resource management system and electric vehicles are simplified into one, communication delay is reduced, which requires high response speed, but may respond to a profitable reserve.

Third, even if a V2G communication standard between electric vehicles and charging facilities is not fully established, it is possible to quickly participate in a market because the electric vehicles directly respond to the distributed energy resource management system.

Fourth, previously sold electric vehicles (which do not support a V2G function) may also participate in a demand response.

DETAILED DESCRIPTION

Various advantages and features of the present disclosure and methods accomplishing them will become apparent from the following description of embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Accordingly, in some embodiments, well-known process steps, well-known device structures, and well-known techniques have not been specifically described in order to avoid obscuring the present disclosure. Throughout the specification, like reference numerals denote like elements.

Thicknesses are enlarged to clearly show several layers and regions. Throughout the present disclosure, like components will be denoted by like reference numerals. It will be understood that when an element such as a layer, a film, a region, or a substrate is referred to as being "on" another element, it may be "right on" another element or may have an intervening element present therebetween. On the other hand, when an element is "right on" another component, there is no object therebetween. In addition, when an element such as a layer, a film, a region, and a plate is "below" another component, it may be "right below" the other element or intervening elements may be present therebetween. On the other hand, when an element is "just under" another component, there is no object therebetween.

In the present specification, the terms such as "first," "second," and "third," may be used to describe various components, but the components are not to be construed as being limited to the terms. The terms are used only in order to distinguish one component from another component. For example, without departing from the scope of the present disclosure, a first component may be referred to as a second or third component, and similarly, second or third component may be alternately named.

Unless defined otherwise, all terms (including technical and scientific terms) used in the present specification have the same meaning as meanings commonly understood by those skilled in the art to which the present disclosure pertains. In addition, terms defined in commonly used dictionary are not ideally or excessively interpreted unless explicitly defined otherwise.

Hereinafter, a demand response system, a control circuit for electric vehicles, and a driving method thereof according to the present disclosure will be described in detail with reference to FIGS. 1 to 3.

Figure 1:
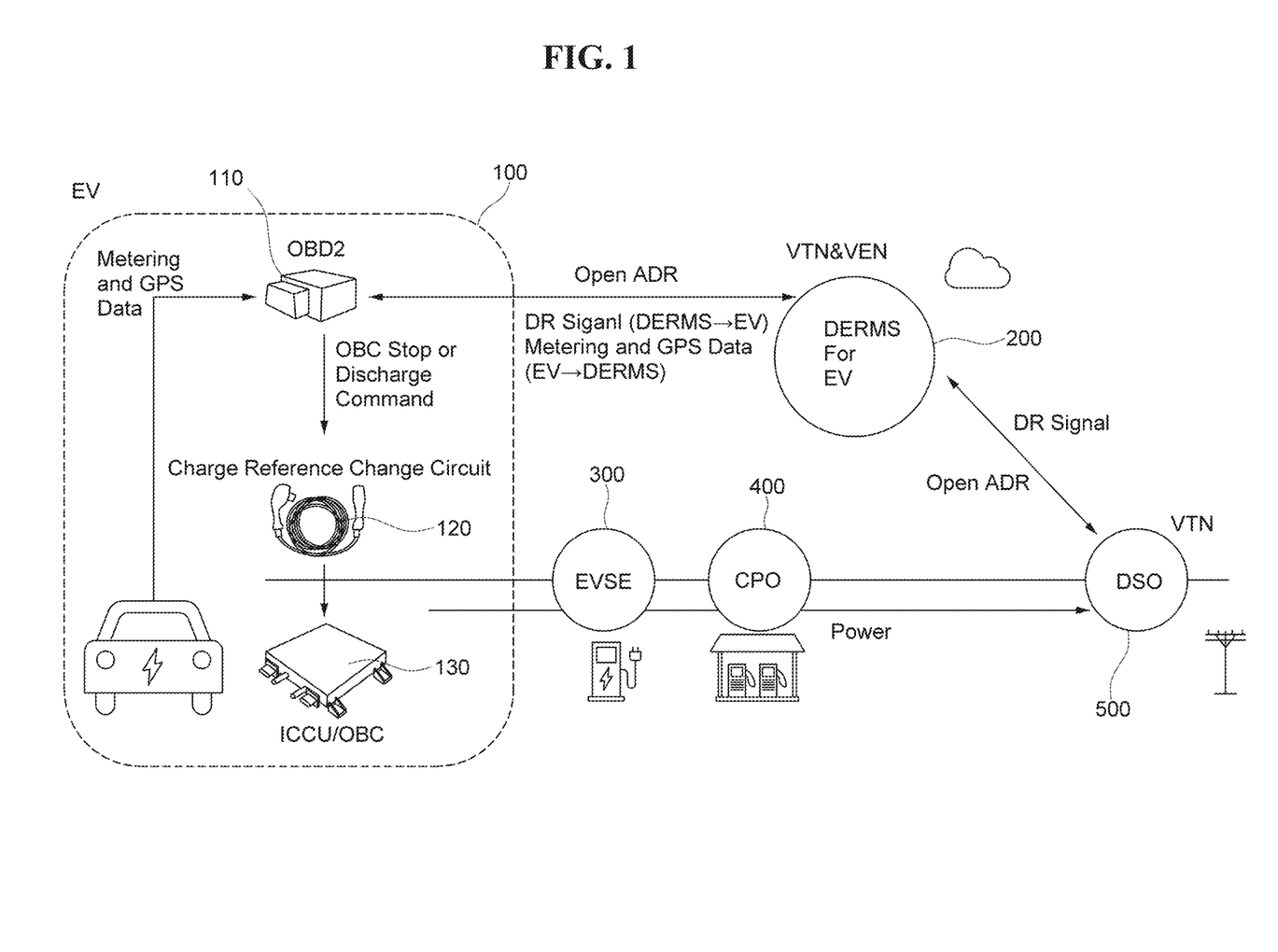
FIG. 1 is a diagram for describing a system for respond to a demand response and a control circuit for electric vehicles to respond to a demand response according to an embodiment of the present disclosure.

FIG. 1 is a diagram for describing a system for respond to a demand response and a control circuit for an electric vehicle 100 to respond to a demand response according to an embodiment of the present disclosure.

As illustrated in FIG. 1, a system for respond to a demand response according to an embodiment of the present disclosure may include a distributed energy resource management system 200 (DERMS), an electric vehicle 100, and a charging equipment 300. Here, the electric vehicle 100 may directly receive a demand response signal from the distributed energy resource management system 200.

Figure 2:
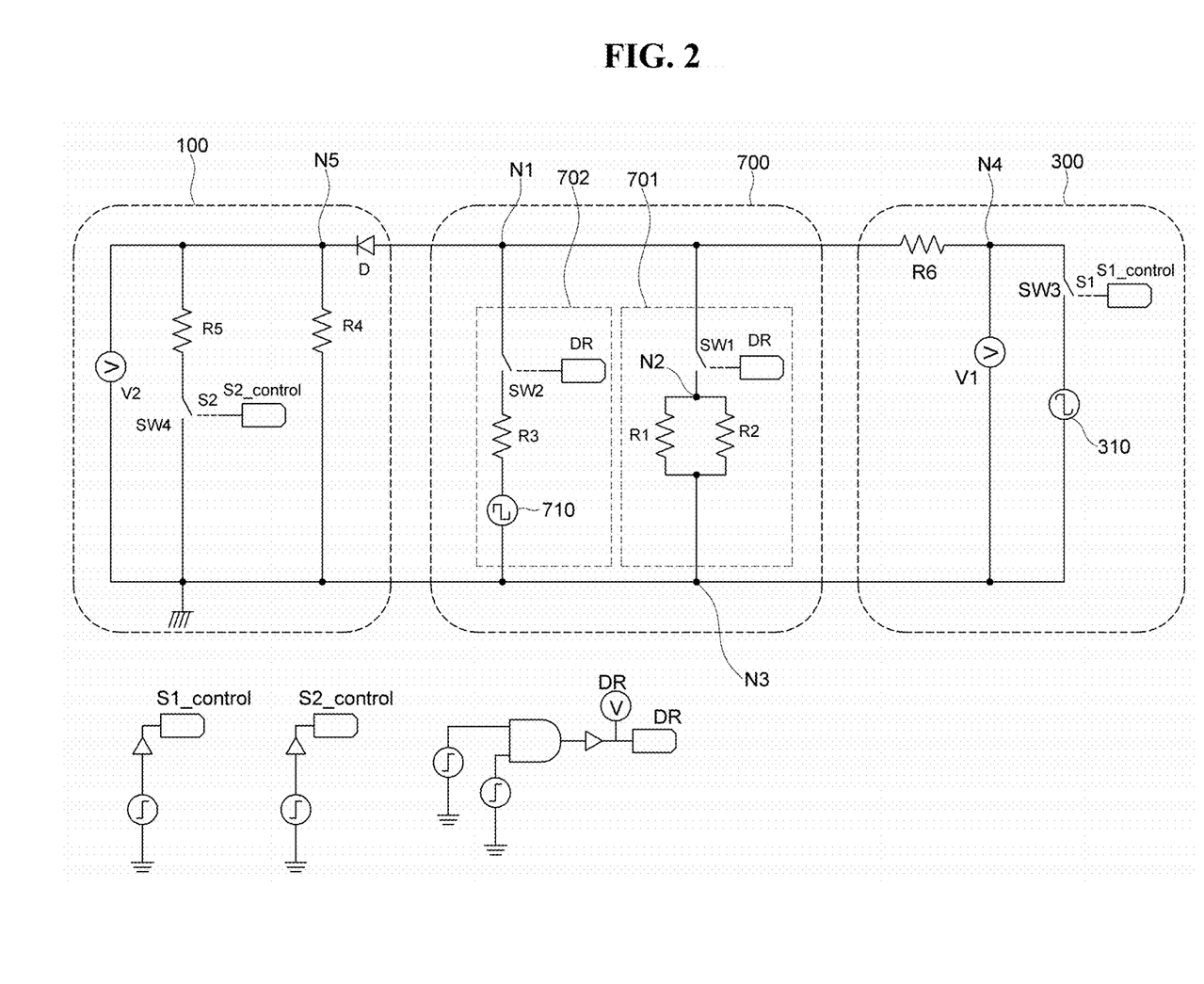
FIG. 2 is a diagram for describing a connection relationship between a charge change circuit and a peripheral circuit.

In addition, as illustrated in FIG. 1, the control circuit for an electric vehicle 100 for respond to demand response according to an embodiment of the present disclosure includes an on board diagnostic 110 (e.g., OBD), a charging device 130, and a charge reference change circuit 700 (see FIG. 2). The on board diagnostic 110, the charging device 130, and the charge reference change circuit 700 may be embedded in the electric vehicle 100.

The on board diagnostic 110 may be a system that monitors a system related to exhaust gas as a diagnostic standard for checking and controlling an electric/electronic operation state of a vehicle (for example, electric vehicle 100), stores information in an electric control unit (ECU) so that, when a failure affecting emissions occurs, a fault code is recorded and a malfunction indicator lamp in a cluster is output to help car drivers and mechanics recognize and diagnose problems.

In the OBD-II (e.g., OBD2 terminal or diagnostic port) regulation of on board diagnostic 110, the compatibility was improved more by standardizing the terms and fault codes of the data link cable (e.g., DLC) connector, communication specifications, and electronic control parts, and the OBD-II regulation of the on board diagnostic 110 has been revised by adding fault determination standards and diagnostic tips for items that increase exhaust gas when a failure occurs. The recent OBD-II system has been used as a fault diagnosis system as well as vehicle exhaust gas regulation. The inspection items of the OBD-II may include, for example, an evaporative emission system (e.g., EVAP System), a fuel detection system, an exhaust gas recirculation detection system (e.g., EGR System), an oxygen sensor monitor, a catalyst monitor, a misfire monitor, a malfunction indicator lamp output (e.g., MIL output), and diagnostic information (e.g., DTC's) at the time of exhaust gas expert information.

In addition, the on board diagnostic 110 may acquire in-vehicle power metering information and global navigation satellite system (e.g., GNSS) information. Here, the GNSS information may include, for example, global positioning system (e.g., GPS) information.

In addition, the on board diagnostic 110 may include an Internet Of Thing (e.g., IOT) communication function for communication with the distributed energy resource management system 200. For example, the on board diagnostic 110 may communicate directly with the distributed energy resource management system 200. As a specific example, the on board diagnostic 110 may directly communicate with the distributed energy resource management system 200 using communication protocol of an open automated demand response (e.g., open ADR). In this case, the on board diagnostic 110 may directly communicate with the distributed energy resource management system 200 described above through the OBD2 terminal (e.g., diagnostic terminal). Accordingly, the on board diagnostic 110 may receive a direct demand response (e.g., DR) signal from the distributed energy resource management system 200.

The above-described demand response is a concept introduced to more efficiently use energy in a smart grid, and the related technical fields will be described in detail as follows. In other words, the smart grid refers to an "intelligent power grid" that optimizes energy efficiency by exchanging real-time information between power providers and consumers in both directions by grafting IT technology to the existing one-way power grid, which includes "generation-transmission, distribution-sale" stages. The basic concept of the smart grid is to connect power plants, power transmission and distribution facilities, and power consumers through information and communication networks, and to operate the entire power system efficiently as one body through information shared in both directions. Countries around the world are accelerating the establishment of a smart grid in order to utilize limited energy resources more efficiently by interactively sharing energy and information about the energy between energy providers and energy consumers. The existing simple supply-oriented energy policy is being converted to an energy demand management policy through the active and interactive power management of the smart grid. Stabilization of power supply and demand is the most important issue in terms of energy demand management, and the concept of demand response as described above has been introduced to reduce overall energy loss by using energy more efficiently. In other words, the demand response is a system in which electricity consumers sell their saved electricity to the electricity market and receive monetary compensation, and subsidizes the financial cost of running expensive generators to customers who saves electricity by reducing reduces electricity consumption instead of running expensive generators during times of high power load. The demand response is called a demand response resource by considering power consuming customers who may respond whenever a power consumption reduction instruction is issued as a resource.

In addition, the on board diagnostic 110 may include a communication function for communication with the charge reference change circuit 700 to be described later.

The on board diagnostic 110 receiving the demand response signal from the distributed energy resource management system 200 may output a preset command signal. In other words, when the demand response signal is provided from the distributed energy resource management system 200, the on board diagnostic 110 may output the command signal.

The charging device 130 may charge a battery of the electric vehicle 100. The charging device 130 may be disposed inside the electric vehicle 100, and the charging device 130 may be, for example, a slow charger (e.g., an on-board charger). The slow charger may be a device that charges an external power supply (having slow speed) with a driving battery (of high voltage). The slow charger may include a method of charging an electric vehicle 100 by supplying general commercial AC power (e.g., 220V) to the electric vehicle 100. The slow charger receives electric energy (e.g., AC power) from the charging equipment 300 (electric vehicle supply equipment (e.g., EVSE); hereinafter, charging equipment 300) for the electric vehicle 100 and charges the high voltage battery through the slow charging cable. The charging time may take about 4 to 6 hours depending on the battery capacity of the electric vehicle 100. The slow charger may be connected to the charging equipment 300 through the slow charging cable described above.

The charge reference change circuit 700 may modulate a pilot signal supplied from the charging equipment 300 to the charging device 130 according to the command signal from the on board diagnostic 110 described above. The pilot signal may be a pulse width modulation (e.g., PWM) signal. This charge reference change circuit 700 may be embedded in any one of, for example, the electric vehicle 100, the slow charging cable 120, and a portable charger (e.g., an In Cable Control Box).

Meanwhile, reference numeral 400 in FIG. 1 denotes a charge point operator, and reference numeral 500 denotes a distribution service operator.

Figure 3:
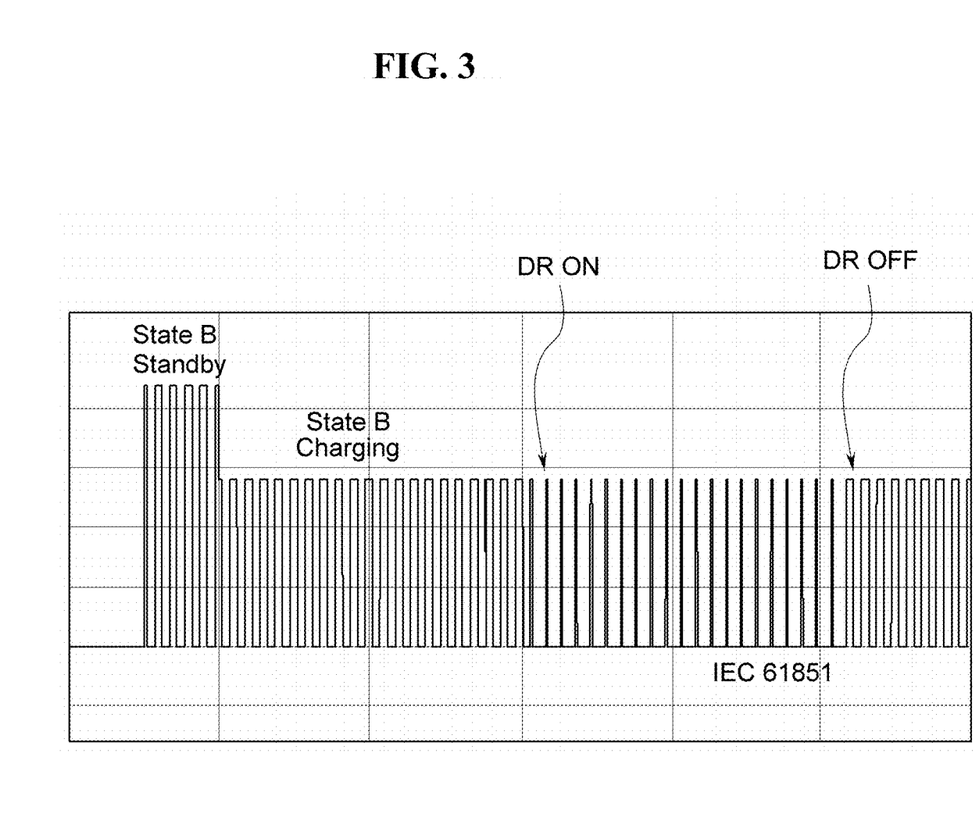
FIG. 3 is a diagram for describing duty ratio modulation of a pilot signal according to a command signal.
Figure 4:
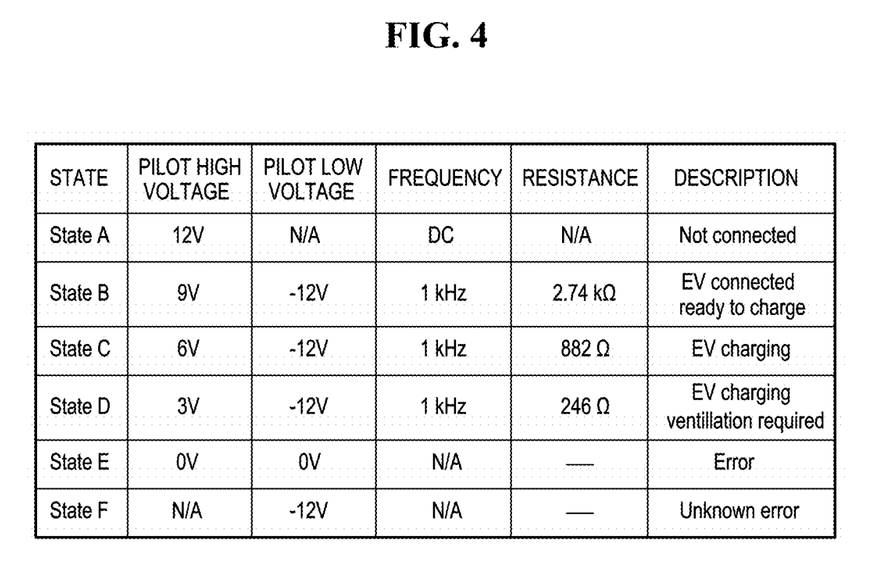
FIG. 4 is a table showing requirements of IEC61851-1.

FIG. 2 is a diagram for describing a connection relationship between a charge change circuit and a peripheral circuit, FIG. 3 is a diagram for describing duty ratio modulation of a pilot signal according to a command signal, and FIG. 4 is a table showing requirements of IEC61851-1.

As illustrated in FIG. 2, the charge reference change circuit 700 may be electrically connected between the electric vehicle 100 and the charging equipment 300. In other words, the charge reference change circuit 700 may be electrically connected between the charging device 130 of the electric vehicle 100 and the charging equipment 300.

The charge reference change circuit 700 may modulate the pilot signal supplied from the charging equipment 300 to the charging device 130 by modulating a duty ratio of the pilot signal. This charge reference change circuit 700 satisfies the requirements of IEC61851-1 between the electric vehicle 100 and the charging equipment 300 and may spoof communication therebetween.

Table 1 below shows the requirements of IEC61851-1.

TABLE 1

| STATE | PILOT HIGH VOLTAGE | PILOT LOW VOLTAGE | FREQUENCY | RESISTANCE | DESCRIPTION |
|---|---|---|---|---|---|
| State A | 12 V | N/A | DC | N/A | Not connected |
| State B | 9 V | ~12 V | 1 kHz | 2.74 kΩ | EV connected, ready to change |
| State C | 6 V | ~12 V | 1 kHz | 882 Ω | EV charging |
| State D | 3 V | ~12 V | 1 kHz | 246 Ω | EV charging, ventilation required |

TABLE 1-continued

| STATE | PILOT HIGH VOLTAGE | PILOT LOW VOLTAGE | FREQUENCY | RESISTANCE | DESCRIPTION |
|---|---|---|---|---|---|
| State E | 0 V | 0 V | N/A | — | Error |
| State F | N/A | ~12 V | N/A | — | Unknown error |

The charge reference change circuit 700 may include, for example, an impedance matching unit 701 and a duty ratio modulation unit 702.

The impedance matching unit 701 may match the impedance between the charging equipment 300 and the charge reference change circuit 700 according to a command signal DR from the on board diagnostic 110. The impedance matching unit 701 may include a first switching element SW1, a first resistor R1, and a second resistor R2. The first switching element SW1 may be controlled according to the command signal DR from the on board diagnostic 110, and may be connected between the first node N1 and the second node N2. The first and second resistors R1 and R2 may be connected in parallel between a second node N2 and a third node N3.

The duty ratio modulation unit 702 may transmit the pilot signal having the modulated duty ratio to the charging device 130 according to the command signal DR from the on board diagnostic 110. The duty ratio modulation unit 702 may include a third resistor R3, a second switching element SW2, and a first pulse generator 710. The second switching element SW2 may be controlled according to the command signal DR from the on board diagnostic 110, and may be connected between the first node N1 and one terminal of the third resistor R3. The first pulse generator 710 may be connected between the other terminal of the third resistor R3 and the third node N3.

When the command signal DR from the on board diagnostic 110 is applied to the first switching element SW1 and the second switching element SW2, the first and second switching elements SW1 and SW2 are turned on. Then, the first and second resistors R1 and R2 may be connected to the circuit of the charging equipment 300 by the turned-on first switching element SW1, and the pilot signal from the first pulse generator 710 may be supplied to a circuit (e.g., a circuit of the charging device 130) of the electric vehicle 100 at a preset duty ratio by the turned-on second switching element SW2. For example, as illustrated in FIG. 3, when the command signal DR is not output (e.g., DR OFF), the duty ratio of the pilot signal may be 50%, and when the command signal DR is output (e.g., DR ON), the duty ratio of the pilot signal may be 10%. In this way, the charge reference change circuit 700 may reduce (e.g., a fixed duty ratio of 50% is reduced to a duty ratio of 10%) the duty ratio of the pilot signal (e.g., PWM signal) from the charging equipment 300 in response to the command signal DR, so the amount of power charged in the electric vehicle 100 may be reduced. In other words, when there is an energy reduction command from the distributed energy resource management system 200, the charge reference change circuit 700 may modulate (e.g., reduce) the duty ratio of the pilot signal applied to the electric vehicle 100 in response thereto, thereby reducing the amount of charge supplied to the electric vehicle 100.

Meanwhile, as illustrated in FIG. 2, the electric vehicle 100 (or the charging device 130 of the electric vehicle 100) may include a diode D connected between the first node N1 and a fifth node N5, a fourth resistor R4 connected between the fifth node N5 and the third node N3, a fifth resistor R5 connected to the fifth node N5 through one terminal, a fourth switching element SW4 controlled by the second control signal and connected between the other terminal of the fifth resistor R5 and the third node N3, and a power supply V2 connected between the fifth node N5 and the third node N3.

In addition, as illustrated in FIG. 2, the charging equipment 300 may include a sixth resistor R6 connected between the first node N1 and the fourth node N4, a second pulse generator 310 connected to the third node N3 through one terminal, a third switching element SW3 controlled according to the first control signal and connected between the fourth node N4 and the other terminal of the second pulse generator 310, and a power supply V1 connected between the fourth node N4 and the third node N3.

When the command signal DR is not output (e.g., DR OFF), the first switching element SW1 and the second switching element SW2 may be turned off. Accordingly, when the command signal DR is not output (e.g., DR OFF), the pilot signal (e.g., a pilot signal having a duty ratio of 50%) from the second pulse generator 310 may be applied to the electric vehicle 100.

On the other hand, when the command signal DR is output (e.g., DR ON), the first switching element SW1 and the second switching element SW2 may be turned on. Accordingly, when the command signal DR is output (e.g., DR ON), the pilot signal (e.g., a pilot signal having a duty ratio of 10%) from the first pulse generator 710 may be applied to the electric vehicle 100.

Meanwhile, when the command signal DR is not output (e.g., DR OFF), the third switching element SW3 may be turned on by the first control signal. Also, when the command signal DR is output (e.g., DR ON), the third switching element SW3 may be in a turned-off state.

Figure 5:
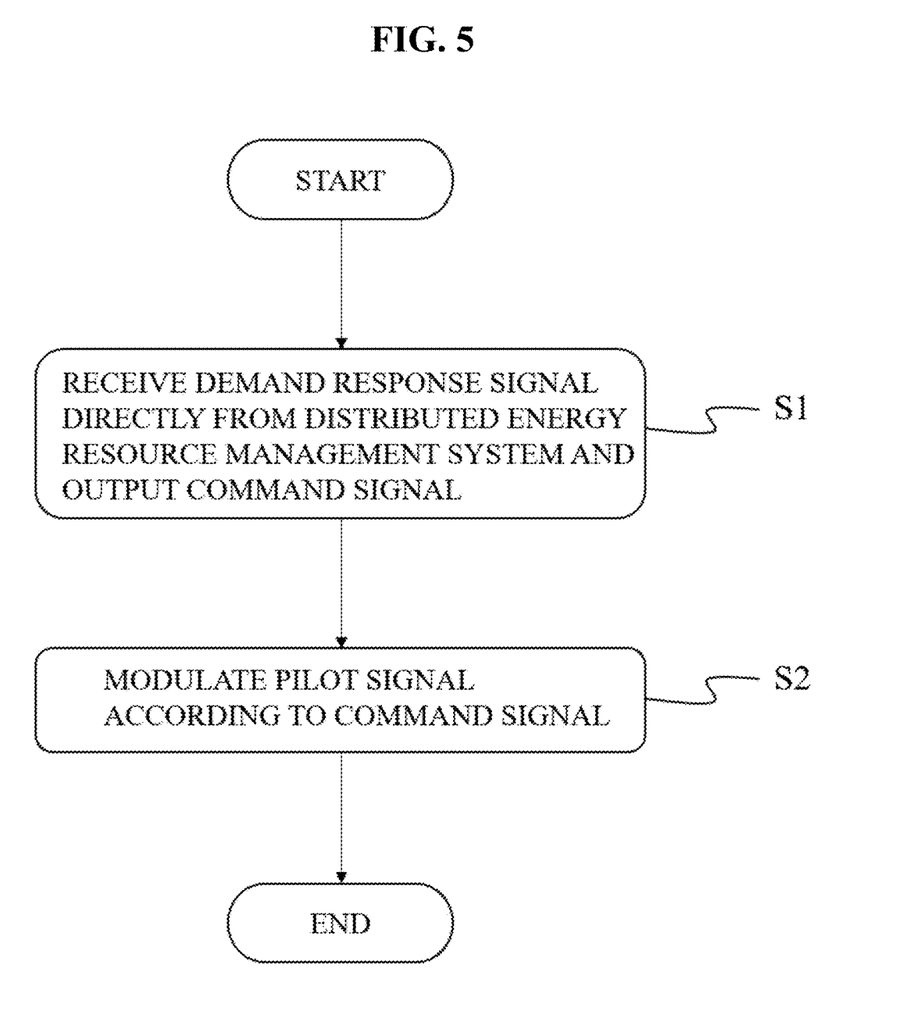
FIG. 5 is a flowchart illustrating a method for driving a control circuit for electric vehicles to respond to a demand response according to an embodiment of the present disclosure.

FIG. 5 is a flowchart illustrating a method for driving a control circuit for electric vehicles to respond to a demand response according to an embodiment of the present disclosure.

According to the method of driving a control circuit for electric vehicles according to an embodiment of the present disclosure, first, a step S1 of directly receiving the demand response signal from the distributed energy resource management system 200, and outputting the command signal DR according to the received demand response signal may be performed.

Then, a step of modulating the pilot signal according to the command signal DR is performed. For example, a step S2 of modulating the pilot signal supplied from the charging equipment 300 to the charging device 130 for charging the battery of the electric vehicle 100 may be performed. In this case, the step S2 of modulating the pilot signal may include the step of modulating the duty ratio of the pilot signal.

It will be obvious to those skilled in the art to which the present disclosure pertains that the present disclosure described above is not limited to the above-described exemplary embodiments and the accompanying drawings, but may be variously substituted, modified, and altered without departing from the scope and spirit of the present disclosure.

What is claimed is:

1. A control circuit for electric vehicles to respond to a demand response, comprising:
an on board diagnostic configured to receive a demand response signal directly from a distributed energy resource management system and output a command signal according to the demand response signal from the distributed energy resource management system;
a charging device configured to charge a battery of an electric vehicle; and
a charge reference change circuit configured to modulate a pilot signal supplied from a charging equipment to the charging device according to a command signal from the on board diagnostic;
wherein the charge reference change circuit includes:
an impedance matching unit and a duty ratio modulation unit,
wherein the impedance matching unit includes:
a first switching element configured to be controlled according to a command signal from the on board diagnostic and connected between a first node and a second node; and
a first resistor and a second resistor configured to be connected in parallel between the second node and a third node,
wherein the duty ratio modulation unit includes:
a third resistor;
a second switching element configured to be controlled according to a command signal from the on board diagnostic and connected between the first node and one terminal of the third resistor; and
a pulse generator configured to be connected between the other terminal of the third resistor and the third node.

2. The control circuit of claim 1, wherein the charge reference change circuit modulates a pilot signal supplied from the charging equipment to the charging device by modulating a duty ratio of the pilot signal.

3. The control circuit of claim 2, wherein the charge reference change circuit includes:
the impedance matching unit configured to match impedances between the charging equipment and the charge reference change circuit according to the command signal from the on board diagnostic; and
the duty ratio modulation unit configured to transmit the pilot signal of a modulated duty ratio to the charging device according to a command signal from the on board diagnostic.

4. The control circuit of claim 1, wherein the charge reference change circuit is disposed in either an electric vehicle or a charging cable connecting the electric vehicle and the charging equipment.

5. A system for responding to a demand response, comprising:
a distributed energy resource management system;
an electric vehicle configured to directly receive a demand response signal from the distributed energy resource management system; and
a charging equipment,
wherein a control circuit of the electric vehicle includes:
an on board diagnostic configured to receive the demand response signal directly from the distributed energy resource management system and output a command signal according to the demand response signal;
a charging device configured to charge a battery of the electric vehicle; and
a charge reference change circuit configured to modulate a pilot signal supplied from a charging equipment to the charging device according to a command signal from the on board diagnostic;
wherein the charge reference change circuit includes:
an impedance matching unit and a duty ratio modulation unit,
wherein the impedance matching unit includes:
a first switching element configured to be controlled according to a command signal from the on board diagnostic and connected between a first node and a second node; and
a first resistor and a second resistor configured to be connected in parallel between the second node and a third node,
wherein the duty ratio modulation unit includes:
a third resistor;
a second switching element configured to be controlled according to a command signal from the on board diagnostic and connected between the first node and one terminal of the third resistor; and
a pulse generator configured to be connected between the other terminal of the third resistor and the third node.

6. The system of claim 5, wherein the charge reference change circuit modulates a pilot signal supplied from the charging equipment to the charging device by modulating a duty ratio of the pilot signal.

7. The system of claim 6, wherein the charge reference change circuit includes:
the impedance matching unit configured to match impedances between the charging equipment and the charge reference change circuit according to the command signal from the on board diagnostic; and
the duty ratio modulation unit configured to transmit the pilot signal of a modulated duty ratio to the charging device according to a command signal from the on board diagnostic.

8. The system of claim 5, wherein the charge reference change circuit is disposed in either an electric vehicle or a charging cable connecting the electric vehicle and the charging equipment.

9. A method for driving a control circuit for electric vehicles to respond to a demand response, comprising:
receiving a demand response signal directly from a distributed energy resource management system, and outputting a command signal according to the demand response signal; and
modulating a pilot signal supplied from a charging equipment to a charging device for automatically charging a battery according to the command signal;
wherein the modulating of the pilot signal turns on a switching element according to the command signal of an on-board diagnostic device and modulates a duty ratio of the pilot signal from a pulse generator, and
wherein the modulating of the pilot signal includes:
controlling a first switching element connected between a first node and a second node according to the command signal;
controlling an impedance matching unit that includes a first resistor and a second resistor connected in parallel between the second node and a third node;
controlling a second switching element connected between the first node and one terminal of a third resistor according to the command signal; and modulating the duty ratio of the pilot signal using the pulse generator, the pulse generator being connected between the other terminal of the third resistor and the third node.

\* \* \* \* \*